No. 656,855. Patented Aug. 28, 1900.
C. H. PIMLOTT.
COVER FOR COOKING UTENSILS.
(Application filed Mar. 12, 1900.)
(No Model.)
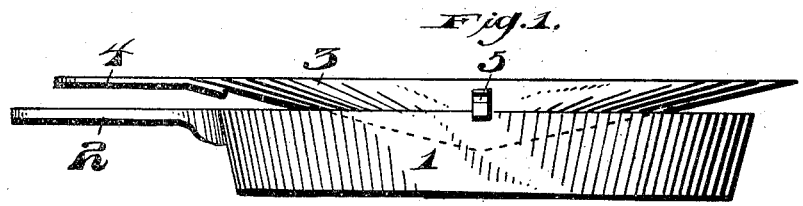
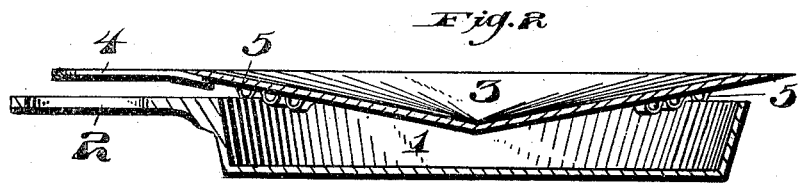
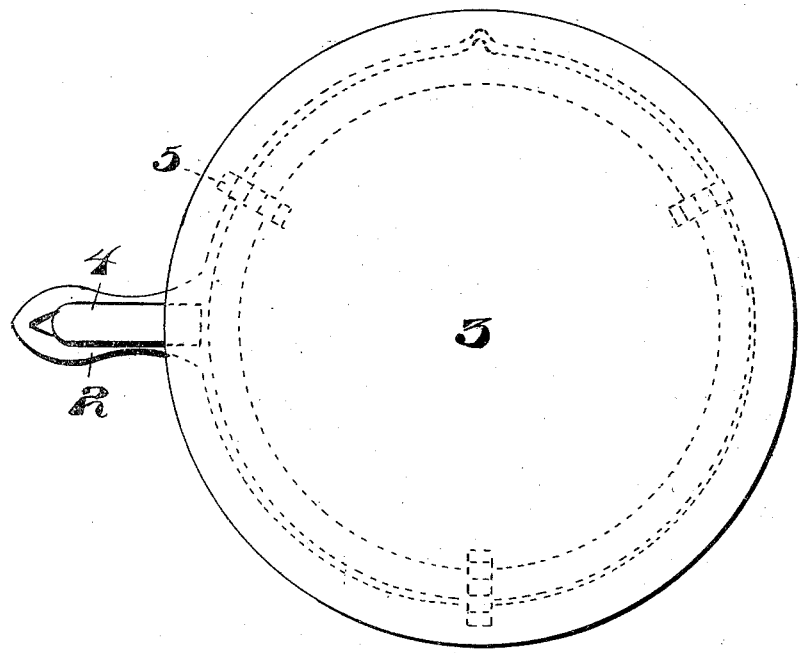
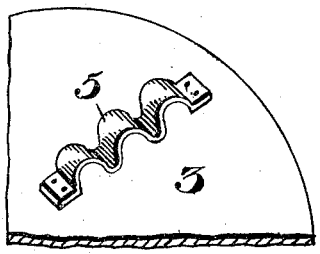
WITNESSES:
INVENTOR
C. H. Pimlott
BY
ATTORNEYS.

United States Patent Office.

CHARLES H. PIMLOTT, OF JOHNSTOWN, PENNSYLVANIA, ASSIGNOR OF ONE-HALF TO JOSEPH REESE, OF SAME PLACE.

COVER FOR COOKING UTENSILS.

SPECIFICATION forming part of Letters Patent No. 656,855, dated August 28, 1900.

Application filed March 12, 1900. Serial No. 8,303. (No model.)

*To all whom it may concern:*

Be it known that I, CHARLES H. PIMLOTT, a citizen of the United States of America, residing at Johnstown, in the county of Cambria and State of Pennsylvania, have invented certain new and useful Improvements in Covers for Cooking Utensils, of which the following is a specification, reference being had therein to the accompanying drawings.

This invention relates to certain new and useful improvements in covers, and is particularly adapted for skillets, spiders, or frying-pans, such as are commonly used on cooking-stoves, ranges, and cooking appliances in general, and the same may be constructed of any suitable metal, such as sheet tin, copper, aluminium, &c.

One object of the invention is to construct a cover or lid for ordinary skillets and frying-pans that will prevent the spattering of grease upon the range or stove top, at the same time overcoming the objections of tight-fitting lids or covers, which convert the skillet or pan into a roasting-pan or steamer. I obtain this object by providing one face of the skillet with a bracket so arranged when supporting the cover as to permit a current of air to pass under the cover and over the contents of the pan or skillet, thus producing the desirable effect of browning the meats, &c., instead of steaming, as produced by numerous steamers and roasters with tight-fitting lids or covers now in general use. The cover is further constructed in a concave manner, so that the spatterings of grease and steam accumulating on the under side of the same will drip back upon the contents of the skillet or pan instead of being scattered upon the stove-top. The cover is further provided with a handle of convenient shape and size to permit of its ready removal or replacement upon the skillet or pan. Furthermore, if desired the cover may be used in an inverted position, thereby making a comparatively-tight lid or cover.

A further object of the invention is to construct a cover of this character which will be extremely simple in its construction, strong, durable, efficient in its use, and comparatively inexpensive to manufacture.

With the above and other objects in view the invention finally consists in the novel construction, combination, and arrangement of parts to be hereinafter more fully described, and specifically pointed out in the claim.

In describing the invention in detail, reference is had to the accompanying drawings, forming a part of this specification, and wherein like numerals of reference indicate corresponding parts throughout the several views, in which—

Figure 1 is a side view of my improved cover arranged upon a skillet. Fig. 2 is a cross-sectional view thereof. Fig. 3 is a top plan view thereof. Fig. 4 is an inverted plan view of a portion of the cover, showing the corrugated supporting-bracket.

Referring to the drawings by reference-numerals, 1 indicates a skillet, and 2 the handle thereof.

The reference-numeral 3 denotes my improved cover, which is constructed of any suitable metallic material and is preferably formed in a concave manner, as shown, and is further provided at one edge with a handle 4. Secured to the lower face of the cover 3 are a series of supporting-brackets 5, which are adapted to engage the edge of the skillet for retaining the cover in position, and these brackets are so constructed as to permit the cover to fit different sizes of skillets and frying-pans—for instance, as herein shown, being corrugated throughout their length, forming alternate raised and depressed portions.

It is thought that the many advantages of my improved cover can be readily understood from the foregoing description, taken in connection with the accompanying drawings, and it will be noted that various changes may be made in the details of construction without departing from the general spirit of my invention.

Having thus fully described my invention, what I claim as new, and desire to secure by Letters Patent, is—

As a new article of manufacture, a metallic cover for skillets or like vessels, comprising a concavo-convex body portion, and a series of circumferentially-arranged supporting-brackets secured to the convex face of said body portion for supporting the same, each of said supporting-brackets consisting of a corrugated metallic strip, substantially as herein shown and described.

In testimony whereof I affix my signature in the presence of two witnesses.

CHARLES H. PIMLOTT.

Witnesses:
EDW. HEUBACH,
JAS. P. MILLER.